March 19, 1929. A. R. STEIRLY 1,705,789
BUSHING PULLER
Original Filed July 12, 1927

Albert R. Steirly Inventor

By Jesse R. Stone
Attorney

Patented Mar. 19, 1929.                                                                1,705,789

UNITED STATES PATENT OFFICE.

ALBERT R. STEIRLY, OF HOUSTON, TEXAS.

BUSHING PULLER.

Refiled for abandoned application Serial No. 205,100, filed July 12, 1927. This application filed January 26, 1929. Serial No. 335,334.

My invention relates to devices for pulling bushings, valve seats and the like when it is desired to renew or repair the part being pulled.

It is common as a mechanical expedient in pumps and the like to provide liners for the pump cylinders and valve seats for the valves which are removable but are held in their operative position by a frictional or drive fit with the housing. When these parts or bushings are thus driven into a seat they are difficult to remove. This is partly from the fact that they are inaccessible so that there is no way of obtaining access to the inner end of the bushing to drive it outwardly.

It is an object of my invention to provide a device for pulling bushings, valve seats, liners and the like when it becomes necessary to remove them from their operative positions.

It is desired that the device be simple and strong in its construction and adapted for operation with a minimum of manipulation and with the consumption of a minimum amount of time.

It is also an object to provide a pulling device of this character which is adjustable for use in pulling bushings in different situations and to make the device adaptable for somewhat various purposes.

This application is a refile after abandonment of my prior application. Serial No. 205,100, filed July 12, 1927.

Figure 2:
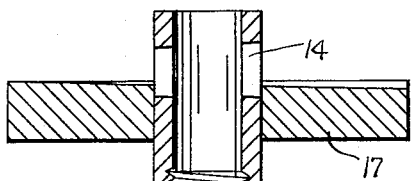
Figure 2:
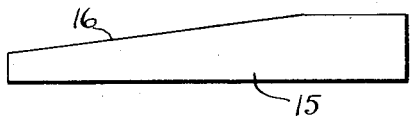
Figure 3:
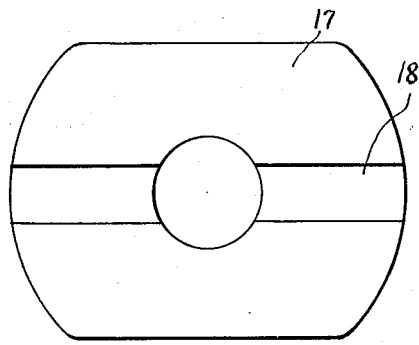
Figure 1:
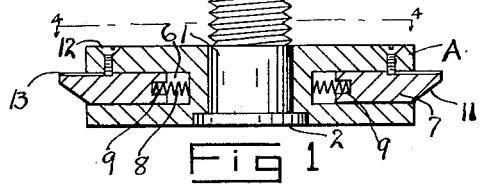
Figure 5:
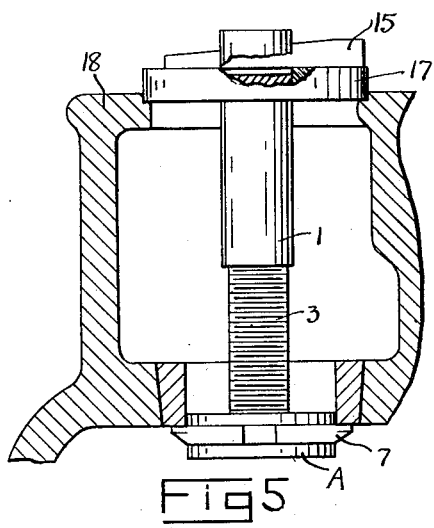
Figure 4:
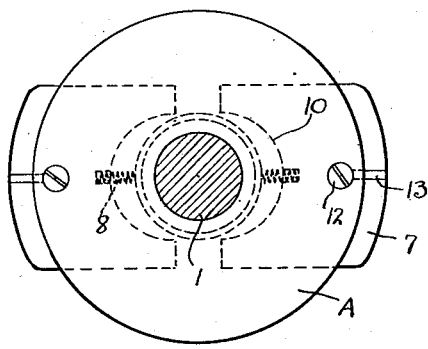

Referring to the drawing herewith, Fig. 1 is a central longitudinal section through a bushing puller embodying my invention. Fig. 2 is a side elevation of the wedge pin removed. Fig. 3 is a top plan view of the supporting plate used with the device. Fig. 4 is a top plan view of the pulling plate, said view being taken on the plane 4—4 of Fig. 1. Fig. 5 is a side elevation of the pulling device shown in position for use in pulling a valve seat, the said seat and the housing in which it is placed being shown in section.

In constructing my device, I employ a bushing engaging member, indicated at A. Said member is mounted upon a post 1 which is extended centrally through the bushing engaging member and is formed with a head 2 which is fitted rigidly within the body of the member A and is of any suitable length. It is preferably formed with a coarse thread 3 thereon to engage with a sleeve 4 which is threaded for engagement therewith and adjustable longitudinally to vary the length of the pulling device. The head A comprises a disc which, as shown in Fig. 4, is circular in shape. It is provided with a circumferential groove or recess 6 therein which extends from the outer periphery of the disc inwardly to a point spaced somewhat away from the post 1. Within this groove on opposite sides of the central post are dogs 7 slidable outwardly within the groove and held resiliently in position extending from the disc by springs 8 fitted at their outer ends within recesses 9 on the inner sides of the dogs.

As shown in Fig. 4, these dogs have arcuate notches or recesses 10 on their inner faces which are adapted to fit about the central hub of the disc. The dogs are of sufficient width to obtain the proper strength and are shaped and formed to engage a bushing for pulling purposes. The lower side of each of the dogs on its outer face is beveled at 11 so as to engage with the valve seat and be forced inwardly against the action of the springs 8 to allow the pulling member to pass downwardly through the valve seat. The dogs are held in position by set screws 12 which extend downwardly through the upper wall of the recess 6 and have their inner ends fitting loosely within grooves 13 in the upper faces of the dogs. These grooves 13 extend from the outer margin inwardly along the upper face of the dog for a distance sufficiently to limit the outward movement of the dog to the proper distance. Thus, as shown in Fig. 1, when the dogs are extended into bushing engaging position, the set screw will be within the inner end of the groove 13 and prevent its further outward movement under the impulse of the spring 8.

The upper end of the sleeve 4 is provided with a diametrical slot 14 to receive a wedge pin 15. The wedge pin is a flat plate adapted to fit within the recess 14 and having its outer face beveled at 16 to contact with the upper end of the slot 14.

I employ a plate 17 to co-operate with the pulling device so as to support the puller while it is being operated. This plate may rest upon the upper wall of the valve housing 18, as shown in Fig. 5, so as to form a support for the pulling device. The upper face of the plate 17 may be provided with a shallow groove 18 extending diametrically across the same, into which wedge plates 15 may slide. The shape of the plate 17 is shown in Fig. 3 and it is contemplated that the guide groove 18 for the wedge will extend across the longitudinal width of the supporting plate 17.

In the use of my device the length of the post 1 and sleeve 4 may be adjusted to accommodate the length of the pulling device to the particular position of the bushing or valve seat, which is to be pulled. The post with the head thereon is then forced inwardly, the size of the head A of the pulling member being such as to allow it to pass downwardly through the bushing or seat. The outer edges of the dogs 11 will be forced inwardly by contact with the bushing or seat and when the dogs have passed below the bushing they will be forced outwardly by the springs to engage below the said bushing so as to exert an upward pull thereon. The pull upon the post 1 and the bushing engaging member is exerted by means of the wedge 15. The plate 17 is placed over the upper end of the post 1 on the sleeve 4 and will rest upon the housing above the bushing. The wedge member 15 will then be driven into the opening 14 in the sleeve and will tend to force the sleeve and post upwardly pulling therewith the bushing in an obvious manner. At each stroke of the driving member upon the wedge an upward jerk upon the puller will take place which will jar the bushing free from its seat, after which it may be drawn outwardly along with the pulling device.

The advantages of this structure will be obvious to those skilled in the art. It is a simple and reliable construction not apt to get out of order, and effective in use.

What I claim as new and desire to protect by Letters Patent is:

1. A bushing puller of the character stated comprising a post, a head thereon including a disc having a deep peripheral groove therein, bushing engaging dogs in said groove, means to hold said dogs resiliently outward, a supporting plate, and means co-operating with said post and said plate to force said head outwardly to exert a pull on said dogs.

2. A bushing puller of the character stated comprising a longitudinally extensible post, a head thereon including a disc having a deep peripheral groove therein, bushing engaging dogs in said groove, means to hold said dogs resiliently outward, means to limit the outward movement of said dogs, a supporting plate, and means co-operating with said post and said plate to force said head outwardly to exert a pull on said dogs.

In testimony whereof I hereunto affix my signature this 23rd day of January A. D. 1929.

ALBERT R. STEIRLY.